H. H. EDWARDS.

TEMPORARY BINDERS FOR BOOKS.

No. 7,815. Reissued July 24, 1877.

Attest.

W. A. Bertram

G. F. Williams

Inventor.

Henry H. Edwards per Atty

R. D. Williams

UNITED STATES PATENT OFFICE.

HENRY H. EDWARDS, OF BALTIMORE, MARYLAND.

IMPROVEMENT IN TEMPORARY BINDERS FOR BOOKS.

Specification forming part of Letters Patent No. 182,650, dated September 26, 1876; Reissue No. 7,815, dated July 24, 1877; application filed June 18, 1877.

*To all whom it may concern:*

Be it known that I, HENRY H. EDWARDS, now of Baltimore, State of Maryland, but formerly of Minneapolis, Minnesota, have invented certain new and useful Improvements in Metallic Binders for Books and Tablets; and I hereby declare the same to be fully, clearly, and exactly described as follows, reference being had to the accompanying drawings, in which—

Figure 1:
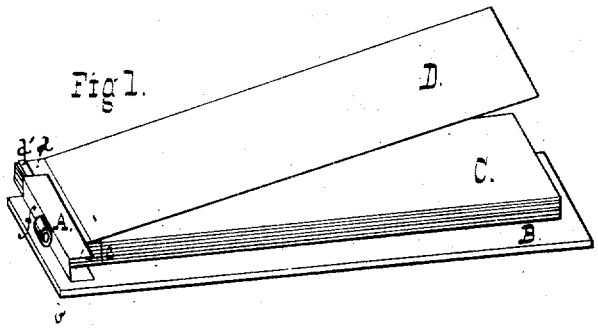
Figure 2:
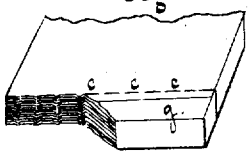
Figure 3:
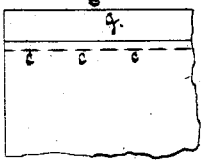
Figure 4:
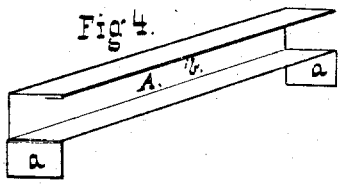
Figure 5:
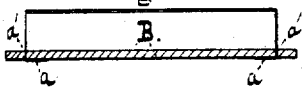

Figure 1 represents a perspective view of a tablet or book embodying my improvements; Fig. 2, a similar view of a portion of a tablet, a part of the same being broken away to better illustrate the construction of the perforations; Fig. 3, a plan view of the tablet; Fig. 4, a perspective view of the binder, and Fig. 5, a longitudinal sectional view of the binder and tablet, showing the attachment of the former to the backing.

My invention relates to what are known as temporary binders; and it consists in a combination of parts adapted to securely retain a book or tablet, and yet admit of the same being readily removed when desired, as hereinafter set forth and claimed.

My invention consists, further, in a book or tablet having certain features and details of construction which need not here be enumerated, as they are also made the subject of claims based upon the following description.

In the accompanying drawings, A represents the binder, which consists of a piece of sheet metal bent thrice in the direction of its length—once to form the narrow shoulder *b*, and twice at right angles, so that the whole forms a double L in cross-section, as shown. The ends of the side opposite to that having the shoulder *b* are allowed to project, forming tangs *a a*, whose function will be presently described.

B represents the backing, which is preferably of card-board, and is provided with slits *a′ a′*. The tangs *a a* of the binder are passed through these slits, and, being bent back, securely fasten the binder to the backing.

C represents the book or tablet, which is constructed as follows: A number of leaves are stitched together at one end, and a paper cover, *g*, is pasted over the end, as shown. The leaves are completely pierced near the stitched end by a line of perforations, *e*, in order to facilitate the removal of any one of the leaves. These perforations are of the peculiar form shown, namely, that of an oblong cut terminated at each end by a sharp incision—a cut, in a word, similar to that made by the point of a two-edged sword or dagger. One of these cuts or incisions in the leaves is in one or both edges of the book, which gives a starting-point in detaching the leaves. The peculiar form of the cut directs the line of tear from one perforation directly into the next, instead of allowing it to take a hap-hazard course, as is occasionally the case with rectangular or circular perforations.

The perforations I use admit of the leaves being detached from the stub without leaving a swelled or ragged edge, and prevent the swelling of the book at the line of the separation of the leaves.

D represents the cover, which is made in two parts, the narrow strip *d* being a flexible connection attached to the main cover, and provided with a metal strip, *d′*, clamped upon the edge to form a stiffener and shoulder, facilitating the insertion of the cover and book, and operating in connection with the shoulder *b* upon the binder, preventing the accidental displacement of the cover.

A suitable loop, *f*, may be attached at the side of the binder, for holding a pencil.

To insert a tablet into the binder, the cover D is laid upon the tablet, and both are slid in sidewise, as shown in Fig. 1.

When the tablet is used up or filled the stub and cover are slid out sidewise together, when a new one may be inserted, as described.

I am aware that sheets of paper and postage-stamps have been perforated with lines of variously-shaped holes, pieces of the paper being actually detached in the forms of circles, diamonds, squares, or ovals. Aside from the inutility of such a form as applied to books or tablets, it is practically impossible, for reasons that are obvious, to perforate a book or tablet in this manner. Such, therefore, I do not claim.

Having thus described my invention, what I claim as new, and desire to secure by Letters Patent, is—

1. The open metallic binder A, provided with the shoulder *b*, substantially as and for the purpose described.

2. In combination with the binder A and book C, the cover D, having strip *d'*, as set forth.

3. In combination with the back B, the binder A, having tangs *a a* and shoulder *b*, substantially as described.

4. In combination with the binder A and back B, the book C and cover D, substantially as described.

5. The cover D, having flexible portion *d* and strip *d'*, as and for the purpose described.

6. As a new article of manufacture, a tablet consisting of a series of leaves pierced with a line of registering oblong incisions, extending clear through the tablet, substantially as described.

7. A tablet having its leaves pierced with a line of symmetrical oblong incisions, the same extending clear through the tablet, one of the incisions being in the edge of the leaves, and serving the purpose of a starter in detaching the same, substantially as described.

HENRY H. EDWARDS.

Witnesses:

R. D. WILLIAMS,

HARRY T. HEANY.